United States Patent
Prasad et al.

(10) Patent No.: US 8,948,120 B2
(45) Date of Patent: Feb. 3, 2015

(54) EXPLOITING HYBRID-CHANNEL INFORMATION FOR DOWNLINK MULTI-USER SCHEDULING

(71) Applicant: NEC Laboratories America, Inc., Princeton, NJ (US)

(72) Inventors: Narayan Prasad, Wyncote, PA (US); Sampath Rangarajan, Bridgewater, NJ (US); Wenzhuo Ouyang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/159,475

(22) Filed: Jan. 21, 2014

(65) Prior Publication Data
US 2014/0204865 A1    Jul. 24, 2014

Related U.S. Application Data

(60) Provisional application No. 61/754,364, filed on Jan. 18, 2013.

(51) Int. Cl.
*H04W 4/00* (2009.01)
*H04L 5/00* (2006.01)
*H04B 7/06* (2006.01)

(52) U.S. Cl.
CPC .......... *H04L 5/0058* (2013.01); *H04B 7/0626* (2013.01)
USPC ........................................................ 370/329

(58) Field of Classification Search
USPC ........ 370/208, 252, 312, 328, 329, 345, 432; 455/423; 714/749, 752
See application file for complete search history.

(56) References Cited

U.S. PATENT DOCUMENTS

| | | | |
|---|---|---|---|
| 2010/0306613 A1* | 12/2010 | Wu et al. | 714/752 |
| 2011/0055653 A1* | 3/2011 | Shirani-Mehr et al. | 714/749 |
| 2013/0237212 A1* | 9/2013 | Khayrallah et al. | 455/423 |

* cited by examiner

*Primary Examiner* — Edan Orgad
*Assistant Examiner* — Saumit Shah
(74) *Attorney, Agent, or Firm* — Joseph Kolodka

(57) ABSTRACT

A method for determining an optimal network utilization maximization in a communication system with wireless links in which current and coarse channel state information CSI is available from all users, along with a limited amount of fine CSI by way of a frame based entails a scheduling and feedback under which a virtual queue is associated with each user with virtual rates being determined at start of each frame and policy of each frame being determined by solving a decision process.

10 Claims, 3 Drawing Sheets

EXPLOITING HYBRID-CHANNEL INFORMATION FOR DOWNLINK MULTI-USER SCHEDULING

RELATED APPLICATION INFORMATION

This application claims priority to provisional application No. 61/754,364, entitled "Exploiting Hybrid Channel Information for MU-MIMO Scheduling", filed Jan. 18, 2013, the contents thereof are incorporated herein by reference.

BACKGROUND OF THE INVENTION

The present invention relates generally to wireless communications, and more particularly, to exploiting hybrid channel information for downlink multi-user scheduling.

Consider a cellular downlink with multiple users (receivers) and a base-station transmitter, where multiple antennas are present at the transmitter. Over such a downlink, linear transmit precoding is known to be advantageous in enabling simultaneous transmissions to multiple users over the same time-frequency resource (a.k.a. multi-user multiple-input multiple output MU-MIMO).

However, the conventional approach for MU-MIMO requires accurate and timely (i.e., delay free) channel state information (CSI) from all the users in order to construct such precoders. Unfortunately, obtaining such accurate and timely CSI is near impossible in practical cellular systems and in the absence of such CSI, the conventional MU-MIMO breaks down and does not offer any gains.

The design of linear precoding schemes and user scheduling algorithms has been considered for multiple user multiple-input multiple-output MU-MIMO situations under the assumption that accurate and timely (i.e., delay free) estimates of CSI from all users can be obtained. These estimates are determined based on the CSI feedback from the users. Prediction based approaches to obtain such estimates have been proposed for the case where the delay in CSI feedback is small enough and a model for the channel evolution is available. However, at-least one of the latter two assumptions does not typically hold A new approach suggested for MU-MIMO, referred to as the MAT scheme, has demonstrated that accurate but arbitrarily delayed CSI can also be exploited to achieve considerable MU-MIMO gains. However, the MAT scheme was proposed for a rather simple setup in which network utility maximization (NUM) via optimized scheduling was not incorporated, and thus it cannot be used over practical systems where the number of users is usually much larger than the number of streams that can be simultaneously scheduled over any time-frequency resource, which makes user scheduling necessary.

Accordingly, there is a need for exploiting hybrid channel information for downlink multi-user scheduling that overcomes the above mentioned limitations.

BRIEF SUMMARY OF THE INVENTION

The present invention is directed to method, implemented by a computer, that includes determining an optimal network utilization maximization in a communication system with wireless links in which current and coarse channel state information CSI is available from all users, along with a limited amount of fine CSI by way of a frame based scheduling and feedback under which a virtual queue is associated with each user with virtual rates being determined at start of each frame and policy of each frame being determined by solving a decision process, the determining includes initializing an index indicative of an interval, a system state and control parameters, and if the interval is not the start of a frame then determining action for current interval using system state for current interval and the state action frequencies computed for the current frame, performing action for current interval, updating virtual queues and incrementing the interval index; and updating system state for the current interval.

In an alternative expression of the invention, a system includes a communication system with wireless links in which current and coarse channel state information CSI is available from all users, along with a limited amount of fine CSI by way of a frame based scheduling and feedback under which a virtual queue is associated with each user with virtual rates being determined at start of each frame and policy of each frame being determined by solving a decision process for determining an optimal network utilization maximization, the system includes computer processing for carrying out the following: initializing an index indicative of an interval, a system state and control parameters; and if the interval is not the start of a frame then: determining action for current interval using system state for current interval and the state action frequencies computed for the current frame, performing action for current interval, updating virtual queues and incrementing the interval index, and updating system state for the current interval.

These and other advantages of the invention will be apparent to those of ordinary skill in the art by reference to the following detailed description and the accompanying drawings.

DETAILED DESCRIPTION

The present invention is directed to a generalized version of the MAT scheme in which current and coarse CSI is available from all the users along with a limited amount of fine albeit delayed CSI. It then formulates a network utility maximization (NUM) framework for this generalized MAT scheme. In this framework, the fine CSI can only be obtained from each user pair that is scheduled over a time-frequency resource, after any specified delay.

The invention's framework can be supported by small changes to the 4G cellular standards specification in which coarse CSI can be reported by all users in a timely fashion using the sparse CSI reference symbols and the limited capacity feedback channel, whereas finer CSI can be determined only by the scheduled users using the dense demodulation reference symbols. A second round of feedback can be added to report such fine CSI incurring very small extra overhead. In addition, a round of feed-forward signaling (also with only a small overhead) is needed to convey certain cross channel information to the users. To solve the NUM problem the invention proposes a novel frame-based scheduling and feedback approach under which a virtual queue is associated with each user. Virtual arrival rates are determined at the start of each frame and the policy for each frame is determined by solving a Markov decision process. This approach is rigorously shown to be optimal and can be tailored to optimize a large class of utility functions.

This invention proposes a joint scheduling and feedback scheme to solve the following problem: Maximize system utility over all throughput vectors that are achievable.

Figure 1:
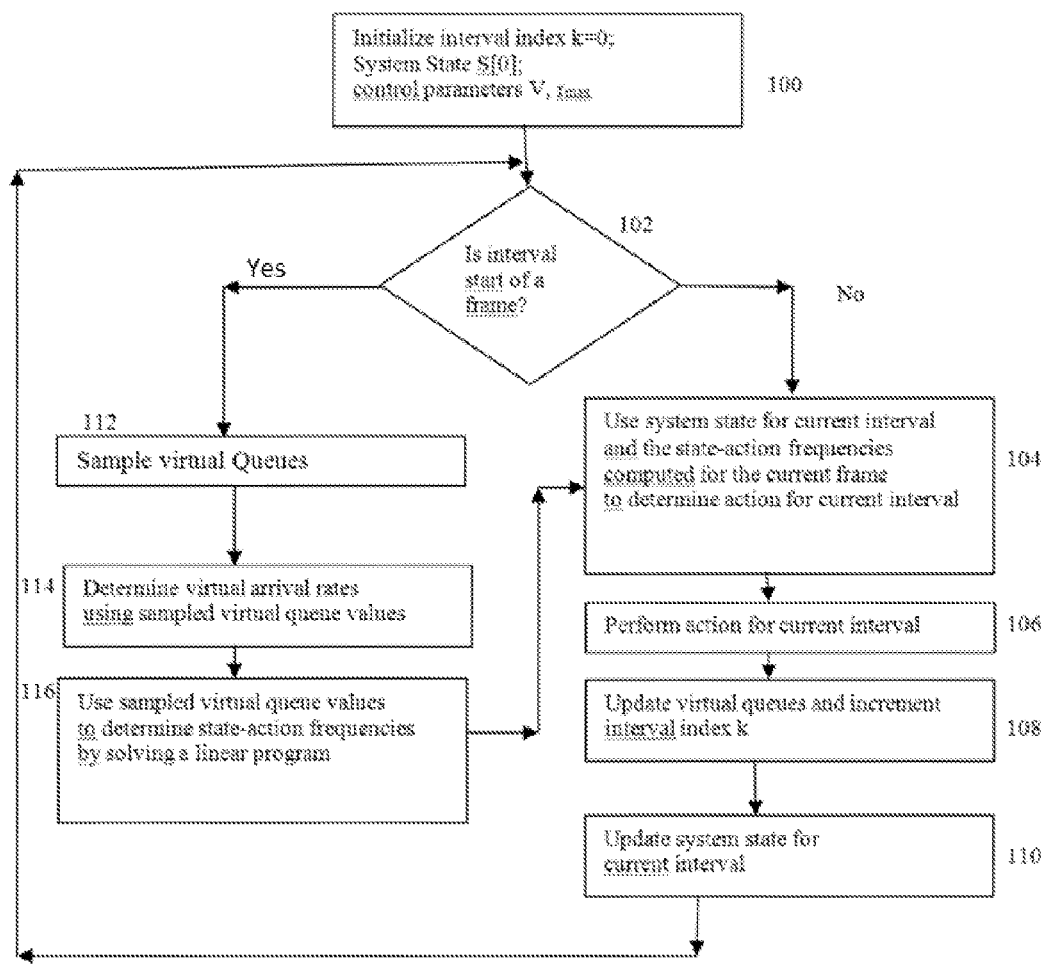
FIG. 1 is flow diagram for joint scheduling and feedback to maximize system utility over all throughput vectors that are achievable, in accordance with the invention.

The joint scheduling solution is depicted in a flow diagram shown in FIG. 1. In conjunction with describing the steps in the flowchart, the equation numbers and section numbers correspond to same numbered equations herein after.

Step 100: Initialize the interval index to 0 and input the system state for interval 0 along with control parameters V, $r_{max}$. The system state at any interval consists of the coarse channel estimates reported by all the N users for that interval. In addition, the system state includes for each possible pair of users, the fine and coarse channel estimates from both users in that pair for the recent-most prior interval on which that user pair was scheduled and the index of that interval.

Step 102: A check is undertaken if the interval k is the start of a frame (i.e., k=τT, τ=0, 1, . . . ) where T is the number of intervals in each frame.

Step 104: If the interval k is not the start of a frame, then there is a use of the system state for current interval, S[k], and the state-action frequencies computed for the current frame to determine action for current interval.

Using the Bayesian rule, we can identify the corresponding stationary policy $\Phi^*_{Q[\tau T]}$, which at any interval k in the $\tau^{th}$ frame first maps the state S[k] to its counterpart s∈S. Then, if $\tau_a x^*(s,a')>0$, it chooses action a using the probabilistic rule $$P(\text{pick } \underline{a} \text{ at state } \underline{s}) = \frac{x^*(\underline{s}, \underline{a})}{\sum_{\underline{a}'} x^*(\underline{s}, \underline{a}')}, \forall \underline{a} \in \mathcal{A}.$$

On the other hand, if $\Sigma_a x^*(s, a')=0$, chooses action a arbitrarily. Let $R^{frame}[k]$, τT≤k≤(τ+1)T−1, denote the service rate vectors obtained under this policy for the intervals in the $\tau^{th}$ frame.

We list the following results which can be obtained using those that have been derived before for weakly communicating Markov Decision Processes [10],[11].

See the Additional Information of the application for discussion of the section B. State-action frequency approach, including this procedure discussed in the paragraph after Equation (18).

Figure 2:
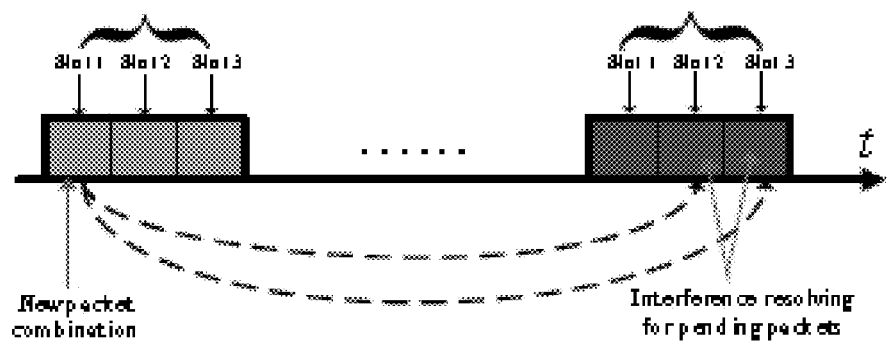
FIG. 2 is a diagram depicting interference resolving for pending packets, discussed in conjunction with FIG. 1.

Step 106: The action determined in Step 104 is performed. The action is performed over the three orthogonal slots in an interval. In the first slot new packets are transmitted to the selected user pair whereas in slots 2 and 3 interference resolution is performed for the selected pair by sending interference resolving packets for a previous (most-recent) pending transmission involving the selected pair. This is depicted by the diagram of FIG. 2 and in conjunction with the following equations (2) to (7).

$$y_{u_1}[k,1] = h_{u_1}[k](x_{u_1}[k] + _{u_2}[k]) + n_{u_1}[k,1], \quad (2)$$

$$y_{u_2}[k,1] = h_{u_2}[k](x_{u_1}[k] + x_{u_2}[k]) + n_{u_2} = [k,1]. \quad (3)$$

$$y_{u_1}[k,2] = h_{u_1}[k]z[k,2](\check{h}_{u_1}[\kappa]x_{u_2}[\kappa]) + n_{u_1}[k,2] \quad (4)$$

$$y_{u_2}[k,2] = h_{u_2}[k]z[k,2](\check{h}_{u_1}[\kappa]x_{u_2}[\kappa]) + n_{u_2}[k,2]. \quad (5)$$

$$y_{u_1}[k,3] = h_{u_1}[k]z[k,3](\check{h}_{u_2}[\kappa]x_{u_1}[\kappa]) + n_{u_1}[k,3] \quad (6)$$

$$y_{u_2}[k,3] = h_{u_2}[k]z[k,3](\check{h}_{u_2}[\kappa]x_{u_1}[\kappa]) + n_{u_2}[k,3]. \quad (7)$$

Equations (2) to (7) are discussed in greater detail in the Additional Information section of the application, II-C. Expected Transmission Rates (Rewards).

Step 108: The virtual queues are updated using Equation (15), and the interval index is incremented, (k→k+1). Note that the service rates obtained for the scheduled user pair can (optionally) be determined based on ACK/NACK feedback from the users.

$$Q_n[k+1] = (Q_n[k] - R_n^{\Psi^*Q[\tau T]}[k])^+ + r^*_n[\tau], \quad (15)$$

Discussion concerning Equation (15) is provided in greater detail in the Additional Information section, III-A. Virtual Queue and Virtual Arrival Process, of the application.

Step 110: The system state for the new current interval k is determined by updating the current coarse CSI in the previous system state to be the coarse CSI reported by all the users for the current interval. In addition, the tuple corresponding to the user pair scheduled in the previous interval is updated using the fine and coarse CSI received from both the users in that pair for the previous interval. Also, the respective fine cross channel estimates are fed-forward to both the users in that pair. The details are described in Section II-B, in the Additional Information section. The process loops back to step 102.

If in Step 102 the interval k is indeed the start of a frame the process moves to Step 112.

Step 112: The virtual queues are sampled. Details of the sampling are discussed in the paragraph above Equation (14) of the Additional Information section of the application, III-A. Virtual Queue and Virtual Arrival Process.

Step 114: Determine virtual arrival rates using sampled virtual queue values in Equation (14):

$$\max_{r:0 \leq r \leq r_{max} 1} V \cdot U(r) - \sum_{n=1}^{N} Q_n[\tau T] r_n, \quad (14)$$

Step 116: Use sampled virtual queue values to determine state-action frequencies by solving a linear program in equation (17), discussed in greater detail in the Additional Information section of the application. III-B. State-action frequency approach:

$$\max_{x} \sum_{\underline{s},\underline{a}} q^T R(\underline{s}, \underline{a}) x(\underline{s}, \underline{a}) \quad (17)$$

s.t. $x \in \mathcal{X}$.

The process proceeds to Step 104.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

Figure 3:
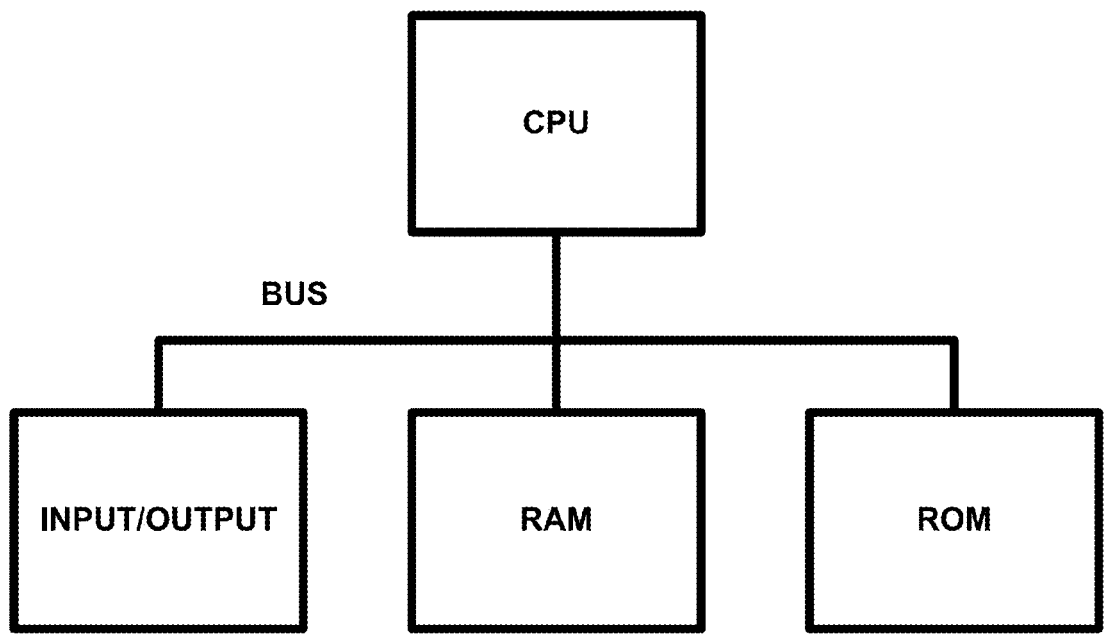
FIG. 3 shows an exemplary computer to perform the invention.

By way of example, a block diagram of a computer to support the system is discussed in conjunction with FIG. 3. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

I. Introduction

Multiple Input Multiple Output (MIMO) technology is essential for the emerging 4G-LTE wireless communication systems. In the downlink of such a system, which typically has several active users, multiple antennas enable simultaneous transmissions to multiple users by allowing the transmitter (base-station) to transmit (along directions in a signal space) in a manner which ensures that each user can receive its intended signal along at-least one interference-free dimension (a.k.a. the Multi-user MIMO principle) [1]. The number of active users is generally greater than the maximum supportable number of simultaneous transmissions, which in turn is equal to the number of transmit antennas at the base-station (BS). Consequently, only a subset of users can be selected for the MU-MIMO transmission and hence proper user scheduling is important to achieve a desired network utility (e.g. throughput, fairness).

The usual assumption made in existing literature on MU-MIMO scheduling is that the BS can obtain the channel state information from all users with sufficient accuracy and with negligible delay. Such information, referred to as the Channel State Information at the Transmitter (CSIT), is crucial to ensure that each scheduled user is not dominated by co-channel interference. Typically, the BS obtains CSIT by broadcasting a sequence of pilot symbols, and the users in turn estimate their CSI and feedback their quantized estimates to the BS. This feedback process introduces two sources of imperfections to the CSIT. (1) Estimation and quantization errors (due to limited training and finite codebooks); (2) Delays (due to user processing speeds and less flexible scheduling on the feedback channel). The impact of erroneous CSIT on MU-MIMO performance has been analyzed in [2] and utility maximization for MU-MIMO with erroneous CSIT has been considered in [4]. Delay in the CSIT has hitherto been addressed by using prediction based approaches but their drawback is that they have to assume a model for channel evolution, which is significantly difficult to obtain in practice and they also require the delay to be small enough to allow for useful prediction.

For the scenario where the number of users is small enough so that user scheduling is unnecessary, referred to here as the static scenario, Maddah-Ali and Tse proposed a scheme, namely the MAT scheme [5], that utilizes CSIT that is error-free albeit completely outdated. Their seminal work revealed that the outdated CSI is an important resource that, when combined with the eavesdropped information at the users, can provide a considerable performance gain in terms of degrees of freedom. Recently, the MAT scheme was extended (for the static scenario) to the hybrid CSIT case by also incorporating coarse and current CSIT [6] to obtain further system gains. However, in the ubiquitous setting where user scheduling is important, such hybrid CSIT needs to be exploited wisely since it is costly to obtain even delayed but error-free CSI feedback from all users for making the scheduling decisions. Indeed, the problem is quite different and more challenging than the static case. User scheduling for the MAT scheme has been considered in [3] but their suggested method is akin to the myopic approach discussed later in this paper.

In this paper, we study MU-MIMO downlink scheduling with hybrid CSIT, erroneous as well as delayed, where the time axis is divided into separate scheduling intervals. We consider the realistic scenario where current and coarse CSIT is obtained from all users while more accurate (not necessarily perfect) but delayed CSIT is obtained only firm the scheduled users. The scheduling problem is hence characterized by an intricate 'exploitation-exploration tradeoff', between scheduling the users based on current CSIT for immediate gains, and scheduling them to obtain finer albeit delayed CSIT and potentially larger future gains. The contributions of the paper are listed as follows.

We tackle the aforementioned 'exploitation-exploration tradeoff' by formulating a frame based joint scheduling and feedback approach, where in each frame a policy is obtained as the solution to a Markov Decision Process (MDP), the latter solution being determined via a state-action frequency approach [10][11].

We consider a general utility function and associate a virtual queue with each user that guides the achieved utility for that user. Based on MDP solutions and virtual queue evolutions, we show that our proposed frame-based joint scheduling and feedback approach can be made arbitrarily close to the optimal.

In the following we use $(.)'$$(.)^T$, $(.)'$ for the transpose and conjugate transpose, respectively. Moreover, $[A, B]$ and $[A; B]$ are used to denote column-wise and row-wise concatenation of matrices A and B, respectively. $\|A\|$ is used to denote the Frobenius norm of the matrix A.

II. System Model and Problem Formulation

We consider the downlink MU-MIMO scheduling problem with one base Station (BS) and N users, the BS is equipped with $M_t$ transmit antennas and employs linear transmit precoding. Each user is equipped with a single receive antenna. Time is divided into intervals and we let $h_i[k] \in \mathbb{C}^{1 \times M_t}$, $i=1, \ldots, N$ denote the channel state vector seen by user i in interval k. In each interval, a subset of users can be simultaneously scheduled. Further, since each user has only one receive antenna, it can achieve at-most one degree of freedom (i.e., its average data rate per channel use can scale with SNR as log(SNR)). On the other hand, the system can achieve at-most $M_t$ degrees of freedom in that the total average system rate can scale with SNR as $M_t \log(SNR)$. For notational convenience we assume that in each interval two users can be simultaneously served, hence limiting the achievable system degrees of freedom to 2. All results can however be extended to the general case without this restriction.

a. Conventional MU-MIMO Scheme

Conventional MU-MIMO scheme relies on estimates of the user channel states (that are available at the BS) for the current interval. Indeed, perfect CSIT for the current interval enables the BS to transmit simultaneously to both scheduled users without causing interference at either of them. However, in the absence of perfect CSIT such complete interference suppression via transmitter side processing is no longer possible and when only very coarse estimates for the current interval are available, conventional MU-MIMO breaks down and in-fact becomes inferior to simple single-user per interval transmission.

B. Joint Scheduling and Channel Feedback

We consider a joint scheduling and feedback scheme that builds upon a variant of the extended MAT technique [6]. The extended MAT scheme is recapitulated in Appendix-A. Specifically, we assume that coarse quantized channel state estimates from all users for the current interval are available to the BS, along with limited finer albeit outdated quantized channel state estimates. In this context we note that in the FDD downlink only quantized estimates are available to the BS and henceforth unless otherwise mentioned, we will use "estimates" to mean "quantized estimates". The time duration of interest is divided into intervals with each interval comprising of 3 slots each. The three slots are mutually orthogonal time-bandwidth slices. For convenience, we assume that all three slots in an interval are within the coherence time and coherence bandwidth window so that the channel seen by each user remains constant over the three slots in an interval. At the beginning of the $k^{th}$ interval, whose corresponding slots are denoted by [k, 1], [k, 2] and [k, 3], the scheduler broadcasts a short sequence of pilot symbols to all the users. This sequence enables a coarse estimation of the wireless channel at each of the N users, which is fed back to the BS after quantization and is denoted by $\hat{H}[k]=\{\hat{h}_i[k], i=1,\ldots N\}$ where $\hat{h}_i[k]$ denotes the coarse channel estimate obtained from user i for interval k. Based on these coarse estimates, along with its past scheduling and channel state history (formally introduced next), the scheduler chooses a pair of users to schedule in the current interval, where in the first slot a linear combination of new packets is sent for the selected user pair. Data transmission to the selected user pair in the current interval also contains additional pilots that enable a finer estimation of the channel states seen by that user pair over the current interval. Note that such finer estimation is crucial for data detection. However, due to user processing and feedback delays, we assume that (quantized versions of) such finer estimates are not available to the BS during the current interval itself. Because of this constraint, instead of performing the transmissions in slots 2 and 3 for interference resolution for the packets sent in Slot 1 of the current interval, as would be done in the extended MAT scheme [6], the BS performs transmissions for interference resolution for packets sent in Slot 1 of the prior most recent interval when the selected user pair was scheduled. The scheduling model is illustrated in FIG. 2.

As mentioned above the scheduler obtains a finer estimate of the channel states seen by a user pair on the interval in which they are scheduled, at the end of that interval. [1]Let $\theta=(u_1, u_2, \kappa)$ represent the 3-tuple denoting the scheduling decision made for the current interval k such that $u_1, u_2$ denote the selected user pair and $\kappa$ denotes the index of the prior most recent interval over which that pair was scheduled. We let $\Gamma[k]$ be the collection of the most recently obtained coarse and finer channel estimates at the BS for each of the user pairs and their corresponding interval indices, at the start of interval k. Thus, the set $\Gamma[k]$ takes the form $\Gamma[k]=\{(\hat{h}_i[\kappa_{i,j}], \hat{h}_j[\kappa_{i,j}], \check{h}_i[\kappa_{i,j}], \check{h}_j[\kappa_{i,j}], \kappa_{i,j}), 1 \le i < j \le N\}$, where $(\check{h}_i[\kappa_{i,j}], \check{h}[\kappa_{i,j}])$ denote the finer estimates for interval $\kappa_{i,j}$ and $\kappa_{i,j}$ denotes the index of the prior recent-most interval on which pair i, j was scheduled. At the end of that interval (equivalently at the start of interval k+1) the set $\Gamma[k+1]$ is obtained by first setting it equal to $\Gamma[k]$ and then updating the tuple corresponding to the pair $(u_1, u_2)$ selected in interval k to $(\hat{h}_{u_1}[k], \hat{h}_{u_2}[k], \check{h}_{u_1}[k], \check{h}_{u_2}[k], k)$.

[1]Arbitrary delays in obtaining such finer estimates are also considered later in the paper.

The set of user channel states are assumed to be i.i.d. across intervals and the channel states of any two distinct users are assumed to be mutually independent. Given a particular initial rough estimates of the channel states of the user pair selected in interval k, $(\hat{h}_{u_1}[k], \hat{h}_{u_2}[k])$, the distribution of the finer channel estimates in the same interval is described by the conditional distribution $$P(\check{h}_{u_1}[k], \check{h}_{u_2}[k] | \hat{h}_{u_1}[k], \hat{h}_{u_2}[k]) \quad (1)$$

where the conditional probability depends on the types of channel estimators, quantization, training times and powers, etc. We let $C_{coarse}$ ($C_{fine}$) denote the finite sets or codebooks of vectors from which all coarse (fine) estimates are selected. Let $|C_{coarse}|$ and $|C_{fine}|$ denote their respective cardinalities and clearly $|C_{fine}| \ge |C_{coarse}|$.

C. Expected Transmission Rates (Rewards)

During the current interval k, formed slots [k,1], [k,2], [k,3], once a pair of users is selected, the scheduler specifies transmit precoding matrices or vectors for each slot in the interval.

1) Slot 1: For slot 1, the overall transmit precoding matrix is denoted by the matrix $[W_{u_1}[k], W_{u_2}[k]]$, where $W_{u_1}[k]$, $W_{u_2}[k] \in \mathbb{C}^{M_t \times 2}$. Let $x_{u_1}[k]=W_{u_1}[k]s_{u_1}[k], x_{u_2}[k]=W_{u_2}[k]s_{u_2}[k]$, where $s_{u_1}[k], s_{u_2}[k]$ denote the 2×1 symbol vectors containing symbols formed using the new packets intended for user $u_1$ and $u_2$, respectively, and where $E[s_{u_i}[k]s_{u_i}^\dagger[k]]=I, i\in\{1,2\}$. Then, the signal transmitted in slot-1 is $x_{u_1}[k]+x_{u_2}[k]$ so that the received signals at both users are $$y_{u_1}[k,1]=h_{u_1}[k](x_{u_1}[k]+x_{u_2}[k])+n_{u_1}[k,1], \quad (2)$$

$$y_{u_2}[k,1]=h_{u_2}[k](x_{u_1}[k]+x_{u_2}[k])+n_{u_2}[k,1]. \quad (3)$$

Note that the allocated transmission power for scheduled user $u_i$ is the norm $\|W_{u_i}[k]\|^2$. We assume that the maximum average (per-slot) transmission power budget at the BS is P. Thus, the corresponding power constraint is $\|W_{u_1}[k]\|^2 + \|W_{u_2}[k]\|^2 \le P$. Notice that the precoding matrix $[W_{u_1}[k], W_{u_2}[k]]$ seeks to facilitate the transmission of new packets to users $u_1$ and $u_2$ and thus must be designed based on the available coarse estimates $(\hat{h}_{u_1}[k], \hat{h}_{u_2}[k])$, since the corresponding finer estimates for that interval are not yet available to the scheduler. Accordingly, we assume that this precoding matrix can be obtained as the output of any arbitrary but fixed (time-invariant) mapping from $C_{coarse} \times C_{coarse}$ to $\mathbb{C}^{M_t \times 4}$, when the coarse estimates $(\hat{h}_{u_1}[k], \hat{h}_{u_2}[k])$ are given as an input. Note that assuming the mapping to be fixed is well suited to systems where the so-called "precoded pilots" are not available so that the choice of precoders needs to be signalled to the scheduled users. A fixed mapping (which is equivalent to one codebook of transmit precoders) then allows for efficient signaling.

Slot 2: In slot 2 of the interval, an interference resolving packet for a pending previous transmission involving users ($u_1$, $u_2$), sent in interval $\kappa<k$, is transmitted. In particular, the transmitted signal vector over the $M_t$ antennas is $$z[k,2](\underbrace{\breve{h}_{u_1}[\kappa]W_{u_2}[\kappa]s_{u_2}[\kappa]}_{x_{u_2}[\kappa]}),$$

where $z[k,2] \in \mathbb{C}^{M_t \times 1}$ is a precoding vector. Note that $\breve{h}_{u_1}[\kappa]x_{u_2}[\kappa]$ is a scalar, so the average power constraint $E[\|z[k,2]\breve{h}_{u_1}[\kappa]x_{u_2}[\kappa]\|^2] \leq P$ can also be written as $\|z[k,2]\|^2\|\breve{h}_{u_1}[\kappa]W_{u_2}[\kappa]\|^2 \leq P$. The received signals in slot 2 at both users are therefore $$y_{u_1}[k,2]=h_{u_1}[k]z[k,2](\breve{h}_{u_1}[\kappa]x_{u_2}[\kappa])+n_{u_1}[k,2] \quad (4)$$

$$y_{u_2}[k,2]=h_{u_2}[k]z[k,2](\breve{h}_{u_1}[\kappa]x_{u_2}[\kappa])+n_{u_2}[k,2]. \quad (5)$$

3) Slot 3: In slot 3 of the interval, similarly, the transmitted signal is $$z[k,3](\underbrace{\breve{h}_{u_2}[\kappa]W_{u_1}[\kappa]s_{u_1}[\kappa]}_{x_{u_1}[\kappa]}).$$

so that the power constraint is $\|z[k,3]\|^2\|\breve{h}_{u_2}[\kappa]W_{u_1}[\kappa]\|^2 \leq P$. The received signals in slot 3 at both users are therefore $$y_{u_1}[k,3]=h_{u_1}[k]z[k,3](\breve{h}_{u_2}[\kappa]x_{u_1}[\kappa])+n_{u_1}[k,3] \quad (6)$$

$$y_{u_2}[k,3]=h_{u_2}[k]z[k,3](\breve{h}_{u_2}[\kappa]x_{u_1}[\kappa])+n_{u_2}[k,3]. \quad (7)$$

Notice that the precoding vectors $z[k,2]$, $z[k,3]$ seek to facilitate the completion of a pending transmission to users $u_1$ and $u_2$ and thus must be designed based on the available coarse estimates ($\hat{h}_{u_1}[k]$, $\hat{h}_{u_2}[k]$), as well as the available estimates for interval $\kappa$ which are ($\breve{h}_{u_1}[\kappa]$, $\breve{h}_{u_2}[\kappa]$) and ($\hat{h}_{u_1}[\kappa]$, $\hat{h}_{u_2}[\kappa]$). Accordingly, we assume that these two vectors can be obtained as the output of an arbitrary but fixed mapping from $C_{line}^2 \times C_{coarse}^4$ to $\mathbb{C}^{M_t \times 2}$. An example of mapping rules to obtain the precoding matrices and vectors is given later in the section on simulation results.

Next, in order to compute the average rates (rewards) we assume that the channel state vectors $h_{u_i}[k]$, $h_{u_i}[k]$ are known perfectly to user $u_i$, $i \in \{1, 2\}$ (each user of course also knows the quantized estimates it has fed back to the base-station). In addition, user $u_1$ ($u_2$) is also conveyed the finer estimate $\breve{h}_{u_2}[\kappa]$, ($\breve{h}_{u_1}[\kappa]$) via feed-forward signaling before the start of interval k. For simplicity, the feedback and feedforward signaling overheads are ignored in this work. Then, by the end of slot 3, from (2), (4) and (6), at user $u_1$, we have $$y_{u_1}[\kappa,1] - \frac{y_{u_1}[k,2]}{h_{u_1}[k]z[k,2]} = \quad (8)$$

$$h_{u_1}[k]x_{u_1}[\kappa] + (h_{u_1}[k]-\breve{h}_{u_1}[\kappa])x_{u_2}[\kappa] + n_{u_1}[k,1] - \frac{n_{u_1}[k,2]}{h_{u_1}[k]z[k,2]},$$

$$y_{u_1}[k,3] = \underbrace{(h_{u_1}[k]z[k,3])\breve{h}_{u_2}[\kappa]x_{u_1}[\kappa]}_{\delta_{u_1}[k]} + n_{u_1}[k,3],$$

where the additive noise variables $n_{u_1}[k,1]$, $n_{u_1}[k,2]$, $n_{u_1}[k,3]$ are i.i.d. circularly symmetric complex Gaussian variables with zero-mean and unit variance, CN(0, 1). Notice that the interference term $(h_{u_1}[\kappa]-\breve{h}_{u_1}[\kappa])x_{u_2}[\kappa]$ is independent of the desired signal as well as the additive noise. Letting $h_{u_1}^{error}[\kappa]=h_{u_1}[\kappa]-\breve{h}_{u_1}[\kappa]$, the noise plus interference covariance for user $u_1$, denoted by $\Gamma_{u_1}[k]$, is therefore $$\begin{bmatrix} 1 + \|h_{u_1}^{error}[\kappa]W_{u_2}[\kappa]\|^2 + \frac{1}{|h_{u_1}[k]z[k,2]|^2} & 0 \\ 0 & 1 \end{bmatrix}.$$

Define $G_{u_1}[k]=[h_{u_1}[k]W_{u_1}[\kappa]; \delta_{u_1}[k]\breve{h}_{u_2}[\kappa]W_{u_1}[\kappa]]$ and note that $G_{u_1}[k] \in \mathbb{C}^{2 \times 2}$. Further, let $H^{csi}((u_1, u_2), (\kappa, k)) = \{\breve{h}_{u_1}[\kappa], \breve{h}_{u_2}[\kappa], \hat{h}_{u_1}[\kappa], \hat{h}_{u_2}[\kappa], \hat{h}_{u_1}[k], \hat{h}_{u_2}[k]\}$ denote the set of channel state information at the scheduler for user pair $u_1$, $u_2$ over intervals $\kappa$, k. Then, using (8) the instantaneous information rate, denoted as $I_{u_1}[k]$ is given by $$I_{u_1}[k] = \frac{1}{3}\log|I + \Gamma_{u_1}^{-1}[k]G_{u_1}[k]G_{u_1}^\dagger[k]|, \quad (9)$$

where the fraction ⅓ is to account for the fact that three slots are needed to obtain this rate. Then, (an optimistic value for) the average information rate that can be achieved via rateless coding (cf. [9]) is given by $$R_{u_1}^{opt}[k]=E[I_{u_1}[k]|H^{csi}((u_1,u_2),(\kappa,k))]. \quad (10)$$

A more conservative rate that is appropriate for conventional coding, denoted as $R_{u_1}^{conv}[k]$, is given by $$r_{\theta,u_1}(1-Pr(I_{u_1}[k]<r_{\theta,u_1}|H^{csi}(u_1,u_2),(\kappa,k)))), \quad (11)$$

where $r_{\theta,u_1}$ denotes the rate assigned (using any fixed mapping) to user $u_1$ in θ before transmission of new packets for the pair ($u_1$, $u_2$) in interval $\kappa$, based on the available coarse estimates $\hat{h}_{u_1}[\kappa]$, $\hat{h}_{u_2}[\kappa]$. The rates corresponding to (10) or (11) can be derived in a similar manner for user $u_2$.

Note that in depriving the average rate in 910) or (11) we have assumed a simple albeit sub-optimal filtering at the user to suppress the interference from the transmission intended for the co-scheduled user. For completeness, we provide the average rate expressions for the case when the user employs the optimal linear filter and for brevity we only consider the optimistic rate for user $u_1$. Towards this end, we collect the observations received by user $u_1$ as $$\begin{bmatrix} y_{u_1}[\kappa,1] \\ y_{u_1}[k,2] \\ y_{u_1}[k,3] \end{bmatrix} = F_{u_1}[k]x_{u_1}[\kappa] + \tilde{F}_{u_1}[k]x_{u_2}[\kappa] + \begin{bmatrix} n_{u_1}[\kappa,1] \\ n_{u_1}[k,2] \\ n_{u_1}[k,3] \end{bmatrix},$$

where $$F_{u_1}[k] = \begin{bmatrix} h_{u_1}[\kappa] \\ 0 \\ \delta_{u_1}[k]\breve{h}_{u_2}[\kappa] \end{bmatrix},$$

$$\tilde{F}_{u_1}[k] = \begin{bmatrix} h_{u_1}[\kappa] \\ h_{u_1}[k]z[k,2]\breve{h}_{u_1}[\kappa] \\ 0 \end{bmatrix}$$

For this model, we can determine the instantaneous information rate that can be achieved via optimal filtering using (9)

but where $\Gamma_{u_1}[k]=I+\tilde{F}_{u_1}[k]W_{u_2}[\kappa]W_{u_2}^\dagger[\kappa]\tilde{F}_{u_1}^\dagger[k]$ and $G_{u_1}[k]=F_{u_1}[k]W_{u_1}[\kappa]$. The average information rate can then determined as before using (10).

We assume that either conventional coding is employed for all users or rateless coding is employed and accordingly let $R_{u_i}[k]$, $1 \le i \le 2$ denote the average rate, henceforth referred to also as the service rate, obtained over interval k. We also note here that the scheduling scheme (policy) is preceded by an initial set-up phase comprising of N(N−1)/2 intervals in which new packets are transmitted successively to each user pair without any accompanying interference resolution packets. For notational convenience, we assume that the scheduling policy starts operating from interval with index 0 using the initial set Γ|0| determined by the set-up phase.

D. Incorporating One-Shot Transmissions and Feedback Delays

We first consider the case of one-shot transmissions. to enable one-shot transmission of packets to any pair in any interval k, we define an action θ in which $u_1$, $u_2$ is the pair but is κ=φ to capture the fact that the intended transmission is one-shot and hence does not seek to resolve any pending previous transmission. Then, in all three slots of that interval transmission is done as in conventional MU-MIMO relying only on the available current estimates Ĥ[k]. In particular, a transmit precoder $[w_{u_1}[k], w_{u_2}[k]] \in \mathbb{C}^{M \times 2}$ is formed based on $\{\hat{h}_{u_1}[k], \hat{h}_{u_2}[k]\}$ using a technique such as zero-forcing [8]. Defining $I_{u_1}^{one-shot}[k]=\log(1+|h_{u_1}[k]w_{u_1}[k]|^2/(1+|h_{u_1}[k]w_{u_2}[k]|))$, the corresponding average rates obtained for user $u_1$ (similarly for user $u_2$) are given by $$E[I_{u_1}^{one-shot}[k]|\hat{h}_{u_1}[k],\hat{h}_{u_2}[k]],$$

or $$r_{\theta,u_1}(1-Pr(I_{u_1}^{one-shot}[k]<r_{\theta,u_1}|\hat{h}_{u_1}[k],\hat{h}_{u_2}[k]))). \quad (12)$$

In addition at the end of interval k, we simply set Γ[k+1]=Γ[k] since no pending packets are completed or introduced.

Recall that so far we have assumed that upon choosing action θ for interval k, the finer estimates $\check{h}_{u_1}[k], \check{h}_{u_2}[k]$ are available at the start of interval k+1 (representing a unit delay). In practical systems there can be a delay of several intervals in obtaining such finer estimates. Assuming that these delays are fixed and known in advance, they can be accommodated by expanding the definition of a state. In particular, we can define 4-tuples such as $(i, j, \kappa_{i,j}, d_{i,j})$ where $d_{i,j} \ge 0$ measures the remaining delay after which finer estimates $h_i[\kappa_{i,j}], h_j[\kappa_{i,j}]$ will be available. At any interval k selecting the action $(i, j, \kappa_{i,j}, d_{i,j})$ with $d_{i,j}>0$ ($d_{i,j}=0$) constrains the interference resolution to be based only on the coarse estimates $\hat{h}_i[\kappa_{i,j}], \hat{h}[\kappa_{i,j}], \hat{h}_i[k], \hat{h}_j[k]$ (on both coarse and fine estimates $H^{cst}((i,j), (\kappa_{i,j}, k))$). Upon selecting this action the 4-tuple in Γ[k+1] corresponding to the pair i, j is set to be (i, j, k, $d_{i,j}-D_{i,j}$) where $D_{i,j}$ is the maximum delay (starting from k+1 after which the finer estimates will be available. If that action is not selected, it is updated in Γ[k+1] as (i, j, $\kappa_{i,j}$, $d_{i,j}=\max\{0, d_{i,j}-1\}$). For convenience in exposition the aforementioned two extensions are not considered below.

E. System State and Throughput Region

Define the system rate at the start of an interval j as S|j|−−{Γ|j|, H|j|} and let θ|j| denote the decision (action) taken in that interval. Then, at each interval k, a scheduling policy takes as input all the history up-to interval k, comprising of states $\{S|j|\}_{j=0}^{k}$ and all decisions $\{\theta|j|\}_{j=0}^{k-1}$ to output a decision θ[k]. Under a particular policy, the throughput of the $n^{th}$ user is denoted as $$r_n^\psi = \lim_{J \to \infty} \frac{1}{J} \sum_{t=0}^{J-1} E[R_n^\psi[t]] \forall n, \quad (13)$$

where $R_n|t|=R_n|t|1(n \in \theta|t|)$ and the expectation is over the initial state and the evolution of the states and decisions in the subsequent intervals. Note that in (13) for simplicity we have assumed that the limit exists for the selected policy. In case the limit does not exist, we can consider any sub-sequence for which the limit exists. Let Ψ be the set of all policies. The throughput region that is of interest to us is defined as the closure of the convex hull of the throughput vectors achievable under all policies in Ψ, i.e., Λ=CH{r:∃∈Ψs.t.,r=r}, where CH {•}denotes closure of the convex hull. For each throughput vector r, we obtain a utility value U(r), where U(•) is the non-negative component-wise non-decreasing and concave utility function. For convenience, we also assume that the utility is continuous (and hence uniformly continuous) in the closed hypercube $|0, b|^N$ for each finite $b \in IR_+$. The objective then is to maximize the network utility within the throughput region. i.e., $\max_{r, r \in A} U(r)$.

III. Optimal Frame-Based Scheduling Policy

In this section we propose a frame based policy that achieves a utility arbitrarily close to the optimal. In this policy, the time intervals are further grouped into separate frames, where each frame consists of T consecutive intervals. The scheduling decisions in each frame are based on a set of virtual queues that guide the achieved system utility towards optimal, as specified next.

A. Virtual Queue and Virtual Arrival Process

To control the achieved utilities of different users, a virtual queue is maintained for each user, denoted as $Q_n[k]$, k−0, 1, ... & n−1, ..., N. At the beginning of the $\tau^{th}$ frame comprising of intervals $\{\tau T, ..., (\tau+1)T-1\}$, where $\tau \in \{0, 1, 2, ...\}$, the following optimization problem is solved at the scheduler $$\max_{r:0 \le r \le r_{max} 1} V \cdot U(r) - \sum_{n=1}^{N} Q_n[\tau T]r_n, \quad (14)$$

where $\tau_{max}$, V are positive constants that can be freely chosen and whose role will be revealed later. We let r*[τ] be the optimal solution to the above problem. Then, the virtual arrival rate for user n is set as $r^*_n[\tau]$ in each interval in the $\tau^{th}$ frame. A scheduling policy, $*_{Q[\tau T]}$ is determined and implemented based on the virtual queue length Q[τT] obtained at the beginning of that frame. Letting $R_n^{\Psi^*Q[\tau T][k]}$denote the service rate of user n in each interval k in the $\tau^{th}$ frame under this policy, the virtual queue is then updated as $$Q_n[k+1]=(Q_n[k]-R_n^{\Psi^*Q[\tau T]}[k])^+ + r^*_n[\tau], \quad (15)$$

for all $\tau T \le k \le (\tau+1)T-1$ and each user n and where $(x)^+=\max\{0,x\}$ with $Q_n[0]=0$ for all n.

B. State-Action Frequency Approach

We now determine the policy $\Psi^*_{Q[\tau T]}$ employed in the $\tau^{th}$ frame. Notice that while the definition of the system state adopted thus far allows us to compactly describe any policy, one associated drawback is that the number of states becomes countably infinite, fortunately, there is one aspect that we can exploit. Note that the average rates obtained upon scheduling a pair of users i, j on any interval k depends only on the corresponding coarse and line channel estimates in interval $\kappa_{i,j}$ (which we recall denotes the prior recent-most interval over which that pair was scheduled) and the coarse channel estimates in interval k but not on those interval indices. Then, to analyze the average rates offered by any policy, it suffices to define a finite set of states, S, as follows. A state s∈S is defined as a particular choice $h_i^{p,fine}$, $h_j^{p,fine}$, $h_i^{p,coarse}$, $h_j^{p,coarse}$, $h_i^{c,coarse}$, $h_j^{c,coarse}$ of coarse and fine channel estimates for each pair i, j, where the superscripts p, c denote past and current estimates, respectively. Consequently there are $$|\underline{S}| = (|C_{fine}|^2 |C_{coarse}|^2)^{\frac{N(N-1)}{2}} |C_{coarse}|^N$$

number of states. Note that a state S[k] in the previous definition would map to state s∈S which has choice $\check{h}_i[\kappa_{i,j}]$, $\check{h}_j[\kappa_{i,j}]$, $\hat{h}_i[\kappa_{i,j}]$, $\hat{h}_j[\kappa_{i,j}]$, $\hat{h}_i[k]$, $\hat{h}_j[k]$ for each pair i, j. A finite set of actions, A, is defined next to be the collection of all possible user pairs so that any a∈A uniquely identifies a user pair. Let P(s|s', a) denote the transition probability, which we note can be determined using (1) and the facts that the finer past estimates of pairs not in a do not change and the current coarse estimates are i.i.d. across intervals. Letting P(A) define the set of all probability distributions on A, any policy can be defined as a mapping which at each interval k takes as input all the history up-to interval k, comprising of states $\{s[j]\}_{j=0}^{k}$ and all actions $\{a[j]\}_{j=0}^{k-1}$, to output a distribution in P[A] from which the action a[k] can be generated. A stationary policy is one which at any interval k considers only the state s[k] to output a distribution in P[A] and where the output distribution depends only on the state s[k] but not on the interval index k. Under any stationary policy the sequence $\{s[k]\}_{k=0}^{\infty}$ is a Markov Chain.

With these definitions in hand, let $R_n(s, a)$ denote the achieved transmission rate for user n when action a is taken and the system state is s. Denote the state action frequencies by $\{x(s, a)\}_{s \in S, a \in A}$, where we note that each x(s, a) lies in the unit interval [0, 1] and represents the frequency that the system state is at s and action a is taken. The state action frequencies need to satisfy the normalization equation $$\sum_{\underline{s},\underline{a}} x(\underline{s}, \underline{a}) = 1,$$

and the balance equation $$\sum_{\underline{a}} x(\underline{s}, \underline{a}) = \sum_{\underline{s}',\underline{a}} P(\underline{s}|\underline{s}', \underline{a}) x(\underline{s}', \underline{a}).$$

The above two equations form a state-action polytope X and let x denote any vector of state action frequencies lying in X. We next define a rate region as $$\tilde{\Lambda} = \left\{ R: R_n = \sum_{\underline{s}} \sum_{\underline{a}} R_n(\underline{s}, \underline{a}) x(\underline{s}, \underline{a}), \forall n \text{ \& } x \in \mathcal{X} \right\}. \quad (16)$$

Then given the virtual queue length $q = Q[\tau T]$ we consider the following linear program (LP).

$$\max_{x} \sum_{\underline{s},\underline{a}} q^T R(\underline{s}, \underline{a}) x(\underline{s}, \underline{a}) \quad (17)$$

$$\text{s.t. } x \in \mathcal{X}.$$

We use $x^*$ to denote an optimal solution to the linear program and define $R^* = [R^*_1, \ldots, R^*_N]^T$, where $$R^*_n = \sum_{\underline{s}} \sum_{\underline{a}} R_n(\underline{s}, \underline{a}) x^*(\underline{s}, \underline{a}), \forall n. \quad (18)$$

Using the Baysian rule, we can identify the corresponding stationary policy $\Psi^*_{Q[\tau T]}$, which at any interval k in the $\tau^{th}$ frame first maps the state S[k] to its counterpart s∈S. Then, if $\Sigma_a x^*(s, a') > 0$, it chooses action a using the probabilistic rule $$P(\text{pick } \underline{a} \text{ at state } \underline{s}) = \frac{x^*(\underline{s}, \underline{a})}{\sum_{\underline{a}'} x^*(\underline{s}, \underline{a}')}, \forall \underline{a} \in \mathcal{A}.$$

On the other hand, if $\Sigma_a x^*(s, a') = 0$, it chooses action a arbitrarily. Let $R^{frame}[k]$, $\tau T \leq k \leq (\tau+1)T-1$, denote the service rate vectors obtained under this policy for the intervals in the $\tau^{th}$ frame.

We list the following results which can be obtained using those that have been derived before weakly communicating Markov Decision Processes [10],[11].

Lemma 1.

The region $\Lambda$ defined in (13) is identical to the region $\tilde{\Lambda}$ defined in (16). Further, for each frame $\tau$ and any given $Q[\tau T]$, an optimal solution to the LP in (17) can be found for which the corresponding policy $\Psi^*_{Q[\tau T]}$ is also deterministic.

Henceforth, we assume to be also $\Psi^*_{Q[\tau T]}$ deterministic.

Lemma 2.

For arbitrarily fixed δ>0 there exists a large enough frame length $T_o$ and constants γ, β such that for each frame length $T \geq T_o$ and all $Q[\tau T]$ $$Pr\left(\left\|\frac{1}{T}\left(\sum_{j=0}^{T-1} R^{frame}[\tau T + j]\right) - R^*\right\| > \delta \middle| Q[\tau T]\right) \leq \gamma \exp(-\beta T). \quad (19)$$

C. Optimality of the Frame-Based Policy

Define the Lyapunov function $$L(Q[\tau T]) = \frac{1}{2} \sum_{n=1}^{N} Q_n^2[\tau T].$$

Then the T-step average Lyapunov drift is expressed as $$\Delta_T(Q[\tau T]) = \frac{1}{T} E[L(Q[(\tau+1)T]) - L(Q[\tau T]) | Q[\tau T]],$$

where the expectation is over the initial states at interval $\tau T$ induced by the policies adopted in the previous frames and the evolution of the states and decisions in the $\tau^{th}$ frame under the policy $\Psi^*_{Q[\tau T]}$. Our first result is the following.

Proposition 1.

For any given $\epsilon>0$, There exists a frame length $T_o$ such that for all frame lengths $T \geq T_o$ the T-step average Lyapunov drift can be bounded as $$\Delta_T(Q[\tau T]) \leq BT - \sum_{n=1}^{N} Q_n[\tau T] R_n + \sum_{n=1}^{N} Q_n[\tau T] r_n^*[\tau], \quad (20)$$

where B is a constant and $R=[R_1, \ldots, R_N]^T$ is any vector such that $R+\epsilon 1 \epsilon \Lambda$.

Proof.

Proved in Appendix-C.

Consider the $\epsilon$-interior of $\Lambda$, i.e. $\Lambda_\epsilon = \{R: R+\epsilon 1 \epsilon \Lambda\}$. Denote $r_\epsilon^{opt}$ as the optimal value of the following optimization problem.

$$\max U(r)$$
$$\text{s.t. } r \in \Lambda_\epsilon; r \leq r_{max} 1.$$

Our main result is the following.

Theorem 1.

For any given $\epsilon>0$, there exists a $T_o$ such that for all frame lengths $T \geq T_o$ $$\liminf_{J \to \infty} U\left(\frac{1}{J} \sum_{t=0}^{J-1} E[R^{frame}[t]]\right) \geq U(r_\epsilon^{opt}) - BT/V.$$

Proof.

Proof Sketch in Appendix-D.

Thus, by choosing $\epsilon$, framelength T and parameters V, $r_{max}$ appropriately, our frame based policy can be made arbitrarily close to optimal.

For comparison we will use the conventional MU-MIMO scheduling described in Section II-A. In addition, we also use the following myopic policy. This policy operates in a manner similar to the frame based policy but with the following important differences. Firstly, the frame-length is set as T=1 so that the arrival rates are computed at the start of each interval and the virtual queues are updated at the end of that interval. Then, at each interval k the current state S[k] is mapped to its image $s \epsilon S$. Considering the queue length q=Q[k], the action $\hat{a}=\arg\max_{a \in A} q^T R(s, a)$ is selected. Clearly this policy does not consider the transition probabilities (and the possible future evolutions) at all while deciding an action. Nevertheless, as seen in the following section, this policy indeed offers a competitive performance.

IV. Simulation Results

We consider the narrowband downlink with four single antenna users that are served by a BS equipped with four transmit antennas. All users are assumed to experience an identical (large scale fading) pathloss factor $\delta$ and thus see an identical average SNR, which models the physical scenario in which all users are equidistant from the BS. Further, we model the small-scale fading seen by each user as Rayleigh fading so the channel response vector of each user is assumed to have i.i.d. $CN(0, \delta^2)$ elements. Consequently the normalized channel response vector (i.e. channel direction) is isotropically distributed in $\mathcal{C}^{4 \times 1}$. Moreover, the channel response vectors evolve independently across intervals and are independent across users. In the following simulations, each user quantizes its channel norm and channel direction separately. In particular, the channel norm is quantized using a scalar quantizer which for simplicity we assume to be identical for both fine and coarse estimates. On the other hand, to quantize the channel direction, in order to obtain the finer estimate, the quantization codebook used comprises of a set independently generated instances of isotropic vectors in $\mathcal{C}^{4 \times 1}$ (a.k.a. random vector codebook), where we note that for large codebook sizes random vector codebooks have been shown to be a good choice for both SU-MIMO and conventional MU-MIMO. The quantization of the channel direction to obtain the coarser estimate is accomplished using Grasmannian codebooks.

Before offering our results, we consider an interval k and decision $\theta$ and describe the mapping rules alluded to in Section II-C. We determine a good direction (i.e. unit-norm beamforming vector) for multicasting using the alternating optimization based multicast beamforming design algorithm [12] that takes only the coarse estimates $h_{u_1}[k]$ and $h_{u_2}[k]$ as inputs and set $$\frac{z[k, 2]}{\|z[k, 2]\|} \text{ and } \frac{z[k, 3]}{\|z[k, 3]\|}$$

to be equal to this direction. The precoding matrix $W_{u_1}[\kappa]$ is obtained by extending the naive zero-forcing design of conventional MU-MIMO to the model in (8). In particular at interval $\kappa$ the BS naively assumes that coarse estimates $\hat{h}_{u_1}[\kappa]$, $\hat{h}_{u_2}[\kappa]$ it has are indeed equal to their respective exact channels (and hence their respective finer estimates). Then, at any future interval k (the knowledge of k is not assumed during interval $\kappa$) when pair $(u_1, u_2)$ is next scheduled, under the naive assumption (8) would reduce to $$y_{u_1}[\kappa, 1] - \frac{y_{u_1}[k, 2]}{h_{u_1}[k] z[k, 2]} = \quad (21)$$
$$\hat{h}_{u_1}[\kappa] x_{u_1}[\kappa] + n_{u_1}[\kappa, 1] - \frac{n_{u_1}[k, 2]}{(h_{u_1}[k] z[k, 2])},$$
$$\frac{y_{u_1}[k, 3]}{(h_{u_1}[k] z[k, 3])} = \hat{h}_{u_2}[\kappa] x_{u_1}[\kappa] + \frac{n_{u_1}[k, 3]}{(h_{u_1}[k] z[k, 3])}.$$

To remove dependence on k, all noise covariances are averaged so that (21) reduces to a point-to-point MIMO channel with channel matrix $[\hat{h}_{u_1}[\kappa]; \hat{h}_{u_2}[\kappa]]$ and noise covariance $\text{diag}\{1+E[1/|h_{u_1}[k]z[k, 2]|^2], E[1/|h_{u_1}[k]z[k, 3]|^2]\}$. Notice however that due to the power constraints these expected values in turn depend on the choice of precoders $W_{u_1}[\kappa]$, $W_{u_2}[\kappa]$. As a further simplification, we fix these expected values to be suitable scalars which are determined offline. The precoder $W_{u_1}[\kappa]$ can now be obtained using the standard point-to-point MIMO precoder design algorithm [7]. The precoder $W_{u_2}[\kappa]$ is computed in an analogous manner. Finally, the norms of the precoding vectors are fixed as $$\|z[k, 2]\| = \frac{\sqrt{P}}{\|\hat{h}_{u_1}[\kappa] W_{u_2}[\kappa]\|}$$

and

-continued $$\|z[k,3]\| = \frac{\sqrt{P}}{\left\|\tilde{h}_{u_2}[k]W_{u_1}[k]\right\|}.$$

Figure 4:
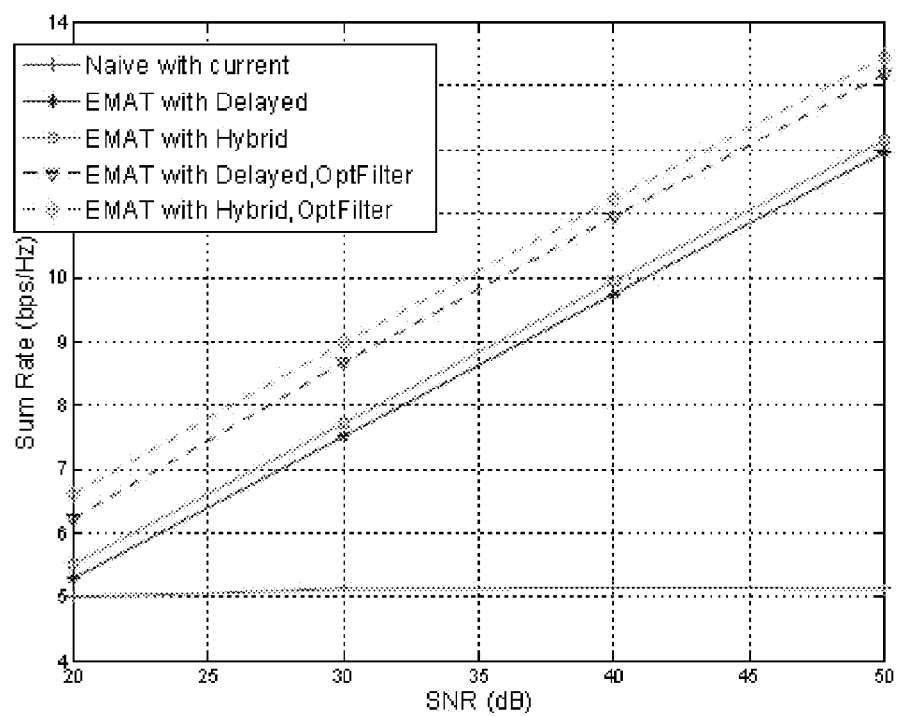
FIG. 4 is a graph comparing the sum utility rate obtained using conventional MU-MIMO that only uses the current CSI with that obtained using myopic scheduling that uses only delayed CSI (EMAT with delayed) and the myopic scheduling that uses the hybrid CSA (EMAT with hybrid), where for the latter two schemes the average rates are computed assuming both the sub-optimal and optimal filtering.

In FIG. 4 we compare the sum rate utility obtained using conventional MU-MIMO that only uses the current CSI with that obtained using the myopic scheduling that uses only the delayed CSI (EMAT with delayed) and the myopic scheduling that uses the hybrid CSI (EMAT with hybrid), where for the latter two schemes the average rates are computed assuming both the sub-optimal and the optimal filtering. In all cases the channel norms were assumed to be perfectly quantized whereas a 2-bit coarse codebook and 5-bit fine codebook were employed to quantize the channel directions, respectively. As seen from the figure, the conventional MU-MIMO gets interference limited and the policy using the finer albeit delayed CSI offers significant gains, which are further improved by utilizing the hybrid CSI. The improvement is more marked upon using optimal filtering.

Figure 5:
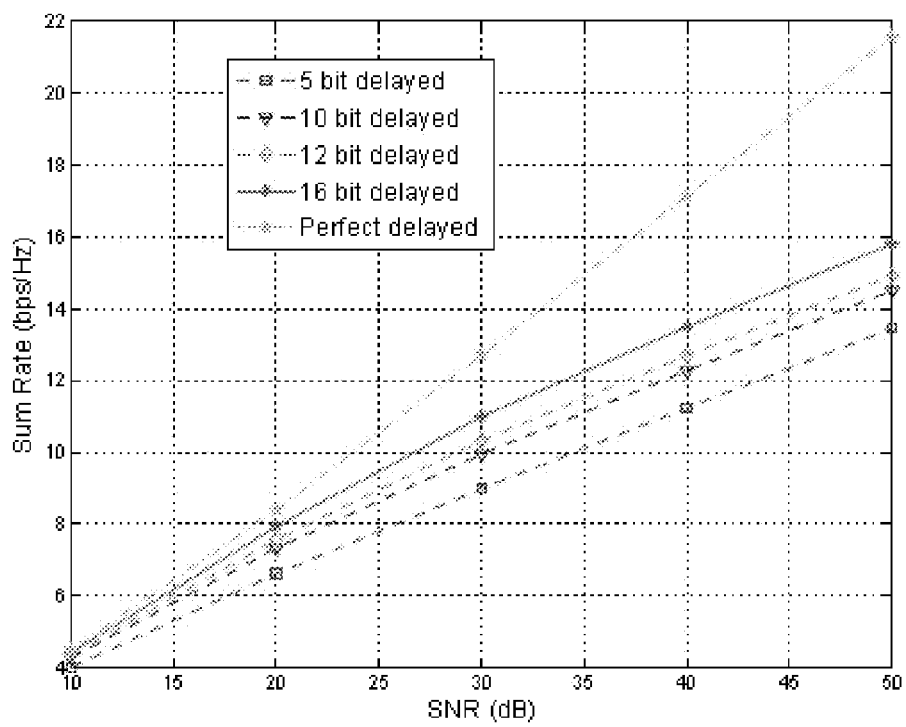
FIG. 5 is a graph comparing the sum rate utility obtained using the myopic scheduling that uses hybrid CSI along with optimal filtering, for different codebook sizes.

In FIG. 5 we consider the same setup as in previous figure but now compare the sum rate utility obtained using the myopic scheduling that uses the hybrid CSI along with the optimal filtering, for different codebook sizes. In particular, in all cases the channel norms were assumed to be perfectly quantized and a 2-bit coarse codebook was employed. Four different codebook sizes (5, 10, 12, and 16 bits) for the fine codebook were employed and compared along with the case when perfect delayed CSI is available to the BS. As seen from the figure, to capture the promised multiplexing gains the codebook sizes must scale sufficiently fast with SNR. We note here that the MAT and EMAT schemes have been designed with the goal of achieving degree of freedom improvements, where aligning (confining) interference to a low dimensional subspace is the paramount concern. The substantial gap compared to the perfect delayed CSI performance observed at a fixed (finite) SNR can be alleviated via proper precoder design that is optimized for a finite SNR. We emphasize that the precoder optimization we undertook to produce these set of results were limited and adhered fully to the EMAT framework.

We also compared the sum rates obtained using our proposed policy and myopic one, respectively, for a simpler examples having fewer number of states. We found that for well designed quantization codebooks, the myopic policy performs very close to the optimal frame based policy. This observation coupled with the fact that the complexity of the myopic policy scales much more benignly with the system size, makes it well suited to practical implementation.

V. Conclusions

We considered the DL MU-MIMO scheduling problem with Hybrid CSIT and proposed an optimal frame-based joint scheduling and feedback approach. There are two important and interesting issues that are the focus of our current research. The foremost one pertains to the exceedingly large number of states that are needed to accommodate practical system sizes which makes implementation of the frame based policy challenging even upon using commercial LP solvers. While the sparse nature of these linear programs can indeed be exploited, an efficient and significant reduction in the number states is necessary. The second issue is the choice of the precoding matrices and vectors. Recall that in this work we have assumed the choice of precoders to be pre-determined and fixed for each (state,action) pair. To fully exploit the precoding gains and the availability of "precoded pilots" in future networks, we should relax this restriction. Finally, we remark that incorporating practical considerations such as delay constraints on scheduling are other important open issues.

REFERENCES

[1] D. Gesbert, M. Kountouris, R. W. Heath Jr. C. Chae and T. Salzer. "From single user to multiuser communications: shifting the MIMO paradigm." *IEEE Signal Proc. Mag.*, October 2007.

[2] G. Caire, N. Jindal, M. Kobayashi and N. Ravindran. "Multiuser MIMO Achievable Rates With Downlink Training and Channel State Feedback." *IEEE Transactions on Information Theory*, June, 2010.

[3] A. Adhikary, H. C. Papadopoulos, S. A. Ramprashad and Giuseppe Caire, "Multi-User MIMO with outdated CSI: Training. Feedback and Scheduling." *Allerton*, October, 2011.

[4] H. Shirani-Mehr, G. Caire and M. Neely. "MIMO Downlink Scheduling with Non-Perfect Channel State Knowledge," *IEEE Trans. on Comm.*, July, 2010.

[5] M. A. Maddah-Ali and D. Tse. "Completely Stale Transmitter Channel State Information is Stall Very Useful", *IEEE Trans. on Information Theory*, July, 2012.

[6] M. Kobayashi, S. Yang, D. Gesbert and Xinping Yi, "On the Degrees of Freedom of time correlated MISO broadcast channel with delayed CSIT." *IEEE Trans. on Information Theory*, January, 2013.

[7] D. Tse and P. Viswanath. "*Fundamentals of wireless communication.*" Cambridge University Press, 2005.

[8] A. Wiesel, Y. C. Eldar and S. Shamai. "Zero-forcing precoding and generalized inverses." *IEEE Trans. Signal Process.*, September 2008.

[9] H. Shirani-Mehr, H. Papadopoulos, S. Ramprashad and G. Caire. "Joint scheduling and ARQ for MU-MIMO downlink in the presence of inter-cell interference," *IEEE Trans. on Comm.*, October, 2011.

[10] E. Altman, "*Constrained Markov Decision Processes*", Chapman & Hall 1999.

[11] K. Jagannathan, S. Mannor, I. Menache and E. Modiano. "A state action frequency approach to throughput maximization over uncertain wireless channels" *IEEE INFOCOM*, Shanghai, China, April 2011.

[12] H. Zhu. N. Prasad and S. Rangarajan. "Precoder Design for Physical Layer Multicasting," *IEEE Trans. Sig. Proc.*, November 2012.

a. Extended MAT Scheme

The MAT scheme [5] is an interesting tool that has been recently proposed to tackle the problem where no channel state estimates for the current interval are available at the BS but perfect albeit delayed CSI is available to the BS. The scheme uses such completely outdated CSIT but still achieves system degrees of freedom equal to 4/3. We recall that in our context MU-MIMO with perfect and current CSIT will achieve 2 system degrees of freedom while single-user transmission will achieve only one degree of freedom. In this paper, we will build upon the following extended MAT scheme [6] that achieves the same system degrees of freedom as the original MAT scheme.

The scheme proceeds as follows. Time is divided into units referred to as rounds. Two messages u and n are to be transmitted, each destined to users i and j respectively, where u and n are $M_t \times 1$ vectors.

The three rounds are introduced next.

Round 1: The transmitted signal is $x[1]=u+v$, the corresponding received signal at user i and j is denoted by $y_i[1]$ and $y_j[1]$, where $$y_i[1]=h_i[1](u+v)+n_i[1], \qquad (22)$$

$$y_j[1]=h_j[1](u+v)+n_j[1]. \qquad (23)$$

where $n_i[1]$ denotes the additive noise at user i in round 1 and $h_i[1] \in \mathbb{C}^{1 \times M_t}$ denotes the channel response vector seen by user i in Round 1.

Round 2: The transmitted signal is $x[2]=[h_i[1]v; 0]$, the received signal for user i and j is respectively $$y_i[2]=h_{i,1}[2] \cdot (h_i[1]v)+n_i[2], \qquad (24)$$

$$y_j[2]=h_{j,1}[2] \cdot (h_j[1]v)+n_j[2], \qquad (25)$$

where $h_{i,1}[2]$ denotes the channel coefficient modeling the propagation environment between user i and the first transmit antenna at the BS during round 2.

Round 3: The transmitted signal is $x_3=[h_j[1]u; 0]$, the received signal for user i and j is respectively $$y_i[3]=h_{i,1}[3] \cdot (h_j[1]u)+n_i[3], \qquad (26)$$

$$y_j[3]=h_{j,1}[3] \cdot (h_j[1]u)+n_j[3]. \qquad (27)$$

It is assumed that the channel state vectors $h_1[1]$, $h_2[2]$, $h_3[3]$ are estimated perfectly by user i at the start of each respective round. Similarly for user j. In addition, the BS is assumed to know channel state vectors $h_i[l]$, $h_j[l]$ perfectly but only after round l for l=1,2,3. Further, user i is also conveyed the channel vector $h_j[1]$ and user j is conveyed the channel vector $h_i[1]$ before the start of round 3, via feed-forward signaling.

Therefore, after Round 3, the $i^{th}$ user can decode message u using (22), (24) and (26) as per the following, $$y_i[1] - \frac{y_i[2]}{h_{i,1}[2]} = h_i[1]u + n_i[1] - \frac{n_i[2]}{h_{i,1}[2]},$$

$$y_i[3] = h_{i,1}[3] \cdot h_j[1]u + n_i[3].$$

Similarly, after Round 3, the $j^{th}$ user can also decode message v. Notice that since the effective received observations seen by each user after three rounds can be modeled as the outputs of two linearly independent equations, each user can achieve two degrees of freedom over three rounds to attain system degrees of freedom equal to 4/3.

B. Practical Variations

We now present another variation of the extended MAT scheme that is more amendable to practical implementation. Notice that the scheme presented above involves estimation, quantization and signaling of channel response vectors. In addition, the precoders also need to be signaled to the scheduled users to enable decoding. This can be accomplished by restricting each precoder to lie in a codebook of possible precoders (known in advance to the BS and all users) and then sending an index that identifies a precoder in that codebook. Another variant that instead exploits precoded pilots is described next. At (or prior to) the start of an interval k, all users will obtain an estimate of their respective channel vectors for the kth interval (using un-precoded pilots transmitted by the BS), quantize their respective estimates and feedback the respective quantized estimates to the BS. This operation enables the BS to construct the set $\hat{H}[k]$. Then, in interval k, during slot 1 the BS will transmit the signal $x_{\theta_1}[k]+x_{\theta_2}[k]$ where as before $x_{\theta_1}[k]=W_{\theta_1}[k]s_{\theta_1}[k]$, $x_{\theta_2}[k]=W_{\theta_2}[k]s_{\theta_2}[k]$, and $s_{\theta_1}[k]$, $s_{\theta_2}[k]$ denote the $2 \times 1$ symbol vectors containing symbols formed using the new packets intended for users $\theta_1$ and $\theta_2$, respectively, with $E[s_{\theta_i}[k]s_{\theta_i}^\dagger[k]]=I$, $i \in \{1,2\}$. In addition, the BS will transmit pilots preceded using the precoder $[W_{\theta_1}[k], W_{\theta_2}[k]]$ to the scheduled pair $\theta_1, \theta_2$. These pilots enable user $\theta_i$ to estimate $h_{\theta_i}[k][W_{\theta_1}[k], W_{\theta_2}[k]]$. User $\theta_1$ can then quantize part of its estimate (using an appropriate quantization codebook) to obtain $\widetilde{h_{\theta_1}[k][W_{\theta_2}[k]]}$. User $\theta_1$ then feeds back $\widetilde{h_{\theta_1}[k][W_{\theta_2}[k]]}$ to the BS. Similarly user $\theta_2$ feeds back $\widetilde{h_{\theta_2}[k][W_{\theta_1}[k]]}$ to the BS.

The BS in slot 2 will transmit the signal vector $z[k, 2]$ $\widetilde{h_{\theta_1}[\theta_3][W_{\theta_2}[\theta_3]]} s_{\theta_1}[\theta_3]$. Note here that $\widetilde{h_{\theta_1}[\theta_3][W_{\theta_2}[\theta_3]]}$ is available to the BS from the feedback from user $\theta_1$ after the interval $\theta_3$. In addition the BS will transmit a pilot precoded by $z[k, 2]$ which allows user $\theta_i$, $i=1,2$ to estimate $h_{\theta_i}[k]z[k, 2]$. Similarly in slot 3, the BS will transmit the signal vector $z[k, 3]$ $\widetilde{h_{\theta_2}[\theta_3][W_{\theta_1}[\theta_3]]} s_{\theta_2}[\theta_3]$. In addition the BS will transmit a pilot precoded by $z[k, 3]$ which allows user $\theta_i$, $i=1,2$ to estimate $h_{\theta_i}[k]z[k, 3]$ These transmissions along with the cross channel feed-forward of $\widetilde{h_{\theta_3}[\theta_3][W_{\theta_1}[\theta_3]]}$ allows for decoding of desired message at user $\theta_1$. Similar observation holds for user $\theta_2$ as well.

An aspect in the frame based scheduling policy that can be improved is described next, recall that we have so far assumed that the precoders are obtained as outputs of arbitrary but fixed mappings when given $$Q_n^2[(\tau+1)T-1] \leq \left(Q_n[\tau T] - \sum_{j=0}^{T-1} R_n^{frame}[\tau T + j]\right)^2 + \qquad (28)$$

$$(Tr_n^*[\tau])^2 + 2Tr_n^*[\tau]\left(Q_n[\tau T] - \sum_{j=0}^{T-1} R_n^{frame}[\tau T + j]\right)^+$$

$$Q_n^2[(\tau+1)T] - (Q_n[\tau T])^2 \leq \left(\sum_{j=0}^{T-1} R_n^{frame}[\tau T + j]\right)^2 + \qquad (29)$$

$$(Tr_n^*[\tau])^2 - 2Q_n[\tau T]\left(\sum_{j=0}^{T-1} R_n^{frame}[\tau T + j] - Tr_n^*[\tau]\right).$$

the coarse or both fine and coarse quantized estimates as inputs. One improvement is to change these mappings in every frame. In particular, at the $\tau^{th}$ frame given we can design suitable mapping functions that also depend on the queue sizes $Q[\tau T]$. Indeed separate mapping functions can be designed for each pair at the start of each frame that also consider the queue sizes for that frame.

C. Proof of Proposition 1

To bound the Lyapunov drift we proceed along the lines of (11) and first note that $$Q_n[(\tau+1)T] \leq \left(Q_n[\tau T] - \sum_{j=0}^{T-1} R_n^{frame}[\tau T + j]\right)^+ + Tr_n^*[\tau],$$

so that (28) holds, which then yields the bound in (29). Using (29) we can bound the T-step Lyapunov drift as in (30). Then, since $R_n^{frame}[j]$, $\forall$ n, j can be bounded above by a constant and $r^*_n[\tau] \leq r_{max}$, $\forall$ n, $\tau$, we obtain the bound $$\Delta_T(Q[\tau T]) \leq BT + \sum_{n=1}^{N} Q_n[\tau T] r_n^*[\tau] - E\left[\sum_{n=1}^{N} Q_n[\tau T] \frac{1}{T}\left(\sum_{j=0}^{T-1} R_n^{frame}[\tau T + j]\right) \middle| Q[\tau T]\right] \quad (31)$$

where B is an appropriate large enough constant. The RHS in (31) can be manipulated to obtain $$\Delta_T(Q[\tau T]) \leq BT + \sum_{n=1}^{N} Q_n[\tau T] r_n^*[\tau] - \sum_{n=1}^{N} Q_n[\tau T] R_n^* - E\left[\sum_{n=1}^{N} Q_n[\tau T]\left(\frac{1}{T}\left(\sum_{j=0}^{T-1} R_n^{frame}[\tau T + j]\right) - R_n^*\right) \middle| Q[\tau T]\right] \quad (30)$$

$$\Delta_T(Q[\tau T]) \leq$$

$$\frac{1}{2T} E\left[\sum_{n=1}^{N}\left(\sum_{j=0}^{T-1} R_n^{frame}[\tau T + j]\right)^2 + \sum_{n=1}^{N}(Tr_n^*[\tau])^2 \middle| Q[\tau T]\right] -$$

$$\frac{1}{T} E\left[\sum_{n=1}^{N} Q_n[\tau T]\left(\sum_{j=0}^{T-1} R_n^{frame}[\tau T + j] - Tr_n^*[\tau]\right) \middle| Q[\tau T]\right]$$

where $R^*=[R^*_1, \ldots, R^*_N]^T$ was defined in (18). Using the Cauchy-Schwartz inequality along with the fact that $\sum_{n=1}^{N}=Q_n[\tau T] \geq \sqrt{\sum_{n=1}^{N} Q_n^2[\tau T]}$, we can then further upper bound $$\Delta_T(Q[\tau T]) \leq BT + \sum_{n=1}^{N} Q_n[\tau T] r_n^*[\tau] - \sum_{n=1}^{N} Q_n[\tau T] R_n^* + \left(\sum_{n=1}^{N} Q_n[\tau T]\right) E\left[\left\|\frac{1}{T}\left(\sum_{j=0}^{T-1} R^{frame}[\tau T + j]\right) - R^*\right\| \middle| Q[\tau T]\right] \quad (32)$$

Invoking Lemma 2 along with the fact that R* is also bounded above, we can deduce that by choosing a large enough frame length we can ensure that $$E\left[\left\|\frac{1}{T}\left(\sum_{j=0}^{T-1} R^{frame}[\tau T + j]\right) - R^*\right\| \middle| Q[\tau T]\right] \leq \epsilon \quad (33)$$

which when used in (32) yields $$\Delta_T(Q[\tau T]) \leq BT + \sum_{n=1}^{N} Q_n[\tau T] r_n^*[\tau] - \sum_{n=1}^{N} Q_n[\tau T] R_n^* + \epsilon \sum_{n=1}^{N} Q_n[\tau T]. \quad (34)$$

Recall that any vector R in the $\epsilon$-interior of $\Lambda$ satisfies $R \leq \check{R} - \epsilon 1$ for some $\check{R} \in \Lambda$. Then, appealing to the fact that $\sum_{n=1}^{N} Q_n[\tau T] R^*_n$ is the optimal solution for the LP in (17) together with Lemma 1, we have that $$\Delta_T(Q[\tau T]) \leq BT + \sum_{n=1}^{N} Q_n[\tau T] r_n^*[\tau] - \sum_{n=1}^{N} Q_n[\tau T](\check{R}_n - \epsilon),$$

from which (20) follows.

D. Proof Sketch of Theorem 1

We leverage some of the techniques used in [4] but we emphasize that the policies considered in [4]] were not frame based and Markov decision processes were not employed there. Using the result in (20) (after assuming a large enough framelength) and subtracting the term $VU(r^*[\tau])$ from both sides, we first obtain $$\Delta_T(Q[\tau T]) - VU(r^*[\tau]) \leq \quad (35)$$

$$BT - \sum_{n=1}^{N} Q_n[\tau T] R_n + \sum_{n=1}^{N} Q_n[\tau T] r_n^*[\tau] - VU(r^*[\tau]).$$

Then recalling that $r^*[\tau]$ is the optimal solution to (14) we have that for any v: $0 \leq v \leq r_{max} 1$ $$\Delta_T(Q[\tau T]) - VU(r^*[\tau]) \leq \quad (36)$$

$$BT - \sum_{n=1}^{N} Q_n[\tau T] R_n + \sum_{n=1}^{N} Q_n[\tau T] v_n - VU(v).$$

Averaging both sides of (36) with respect to $Q[\tau T]$, we obtain $$\frac{1}{T} E[L(Q[(\tau+1)T])] - \frac{1}{T} E[L(Q[\tau T])] - VE[U(r^*[\tau])] \leq \quad (37)$$

$$BT - \sum_{n=1}^{N} E[Q_n[\tau T]] R_n + \sum_{n=1}^{N} E[Q_n[\tau T]] v_n - VU(v).$$

Noting that $Q_n[0]=0$, $\forall$ n and summing (37) over $\tau=0, 1, \ldots, t-1$ we get $$\frac{1}{T} E[L(Q[tT])] - \sum_{\tau=0}^{t-1} VE[U(r^*[\tau])] \leq$$

$$BTt - \sum_{n=1}^{N}\sum_{\tau=0}^{t-1} E[Q_n[\tau T]] R_n + \sum_{n=1}^{N}\sum_{\tau=0}^{t-1} E[Q_n[\tau T]] v_n - tVU(v)$$

which when combined with the fact that $$\frac{1}{T} E[L(Q[tT])] \geq 0 \text{ yields}$$

$$\frac{1}{t}\sum_{n=1}^{N}\sum_{\tau=0}^{t-1} E[Q_n[\tau T]](R_n - v_n) \leq BT + \frac{1}{t}\sum_{\tau=0}^{t-1} VE[U(r^*[\tau])] - VU(v). \quad (38)$$

Next choosing any R∈κ_ϵ and v: 0<v=R−δ1 and v≤r_{max}1 for some δ>0, and substituting in (38), we get that $$\frac{1}{t}\sum_{n=1}^{N}\sum_{\tau=0}^{t-1}\delta E[Q_n[\tau T]] \le BT + \frac{1}{t}\sum_{\tau=0}^{t-1}VE[U(r^*[\tau])] - VY(v),$$

which using the componentwise non-increasing property of the utility function yields $$\frac{1}{t}\sum_{n=1}^{N}\sum_{\tau=0}^{t-1}\delta E[Q_n[\tau T]] \le BT + VU(r_{max}1) - VU(v), \forall t. \quad (39)$$

Then since $Q_n[\tau T+j] \le Q_n[\tau T] + j r_{max}$, $\forall$ n, j and $U(v) \ge \theta > -\infty$ for some constant θ, from (39) we can conclude that $$\frac{1}{J}\sum_{n=1}^{N}\sum_{j=0}^{J-1}\delta E[Q_n[j]]$$

is also bounded above by a constant for all J, which proves that all virtual queues are strongly stable under the frame based policy. Letting $A_n[\tau T+j]=r^*[\tau]$, $\forall 0 \le j \le T-1$, τ=0, 1 ..., denote the per-slot virtual arrival rate, from strong stability of each virtual queue, uniformly bounded arrival rates and uniform continuity of the utility function, we can deduce that $$\liminf_{J\to\infty} U\left(\frac{1}{J}\sum_{j=0}^{J-1} E[A[j]]\right) \le \liminf_{J\to\infty} U\left(\frac{1}{J}\sum_{j=0}^{J-1} E[R^{frame}[j]]\right). \quad (40)$$

Finally setting $R=v=r_\epsilon^{opt}$ in (38) we obtain $$\frac{1}{t}\sum_{\tau=0}^{t-1} VE[U(r^*[\tau])] \ge VU(r_\epsilon^{opt}) - BT, \quad (41)$$

which upon invoking the concavity of the utility function and the linearity of the expectation operator yields $$U\left(\frac{1}{t}\sum_{\tau=0}^{t-1} E[r^*[\tau]]\right) \ge U(r_\epsilon^{opt}) - BT/V. \quad (42)$$

Notice then that due to the uniform continuity of the utility function, $$\liminf_{t\to\infty} U\left(\frac{1}{t}\sum_{\tau=0}^{t-1} E[r^*[\tau]]\right)$$

is equal to $$\liminf_{J\to\infty} U\left(\frac{1}{TJ}\sum_{j=0}^{TJ-1} E[A[j]]\right) = \liminf_{J\to\infty} U\left(\frac{1}{J}\sum_{j=0}^{J-1} E[A[j]]\right) \quad (43)$$

which when used in (42) yields $$\liminf_{J\to\infty} U\left(\frac{1}{J}\sum_{j=0}^{J-1} E[A[j]]\right) \ge U(r_\epsilon^{opt}) - BT/V. \quad (44)$$

Using (44) and (40) yields the desired result.

From the foregoing it can be appreciated that the features and benefits of the invention applied in the optical communication network, this invention allows the network owners to have better utilization of their hardware resources (including both the communication equipment, and the bandwidth resource), which will lead to better profitability over their asset. It also boosts the network performance since the operation can be done on a finer granularity and better flexibility.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method comprising steps:
    determining an optimal network utilization maximization in a communication system with wireless links in which current and coarse channel state information CSI is available from all users, along with a limited amount of fine CSI by way of a frame based scheduling and feedback under which a virtual queue is associated with each user with virtual rates being determined at start of each frame and policy of each frame being determined by solving a decision process, said determining comprising:
    initializing an index indicative of an interval, a system state and control parameters;
    if the interval is not the start of a frame then:
        determining action for current interval using system state for current interval and state action frequencies computed for the current frame;
        performing action for current interval;
        updating virtual queues and incrementing the interval index;
        updating system state for the current interval
    wherein the system state at any interval consists of coarse channel estimates reported by all users for that interval, the system state includes for each possible pair of users, the fine and coarse channel estimates from both users in that pair for the recent-most prior interval on which that user pair was scheduled and the index of that interval and wherein the above steps are carried out by computer processing.

2. The method of claim 1, wherein
    if the interval is the start of a frame then:
        sampling of virtual queues;
        determining virtual arrival rates using sampled virtual queue rates;
        using sampled virtual queue to determine state-action frequencies by a linear process.

3. The method for claim 1, wherein performing action for current interval, comprises the action being performed over three orthogonal slots in an interval, with a first slot of new packets being transmitted to a selected user pair whereas in slots 2 and 3 interference resolution is performed for the selected pair by sending interference resolving packets for a previous pending transmission involving the selected pair.

4. The method of claim 1, wherein updating system state for current interval, comprises updating coarse channel state information CSI reported by all users for the current interval and a tuple corresponding to the user pair scheduled in the previous interval is updated using the fine and coarse CSI received from both users in that pair for the previous interval and respective fine channel estimates are fed forward to both the users in that pair.

5. The method of claim 2, wherein determining virtual arrival rates, comprises using sampled virtual queues in $$\max_{r:0 \leq r \leq r_{max} 1} V \cdot U(r) - \sum_{n=1}^{N} Q_n[\tau T] r_n,$$

where the virtual queue maintained for each user is denoted as $Q_n[k]$, $k=0, 1, \ldots$ & $n=1, \ldots, N$, virtual arrival rate for a user n is set at $r^*_n[\tau]$ in each interval in the $\tau^{th}$ frame, V is a positive constant, and U (r) is a utility value.

6. A system comprising:
a communication system with wireless links in which current and coarse channel state information CSI is available from all users, along with a limited amount of fine CSI by way of a frame based scheduling and feedback under which a virtual queue is associated with each user with virtual rates being determined at start of each frame and policy of each frame being determined by solving a decision process for determining an optimal network utilization maximization, the system includes computer processing for carrying out the following:
  initializing an index indicative of an interval, a system state and control parameters; and
  if the interval is not the start of a frame then:
    determining action for current interval using system state for current interval and state action frequencies computed for the current frame;
    performing action for current interval;
    updating virtual queues and incrementing the interval index; and
    updating system state for the current interval, wherein a system state at any interval includes coarse channel estimates reported by all users for that interval, the system state including for each possible pair of users, fine and coarse channel estimates from both users in that pair for the recent-most prior interval on which that user pair was scheduled and an index of that interval.

7. The system of claim 6, wherein
if the interval is the start of a frame then:
  sampling of virtual queues;
  determining virtual arrival rates using sampled virtual queue rates;
  using sampled virtual queue to determine state-action frequencies by a linear process.

8. The system of claim 6, wherein performing action for current interval, comprises the action being performed over three orthogonal slots in an interval, with a first slot of new packets being transmitted to a selected user pair whereas in slots 2 and 3 interference resolution is performed for the selected pair by sending interference resolving packets for a previous pending transmission involving the selected pair.

9. The method of claim 6, wherein updating system state for current interval, comprises updating coarse channel state information CSI reported by all users for the current interval and a tuple corresponding to the user pair scheduled in the previous interval is updated using the fine and coarse CSI received from both users in that pair for the previous interval and respective fine channel estimates are fed forward to both the users in that pair.

10. The method of claim 7, wherein determining virtual arrival rates, comprises using sampled virtual queues in $$\max_{r:0 \leq r \leq r_{max} 1} V \cdot U(r) - \sum_{n=1}^{N} Q_n[\tau T] r_n,$$

where the virtual queue maintained for each user is denoted as $Q_n[k]$, $k=0, 1, \ldots$ & $n=1, \ldots, N$, virtual arrival rate for a user n is set at $r^*_n[T]$ in each interval in the $\tau^{th}$ frame, V is a positive constant, and U (r) is a utility value.

* * * * *